US009571685B2

(12) United States Patent
Yamazaki

(10) Patent No.: US 9,571,685 B2
(45) Date of Patent: Feb. 14, 2017

(54) IMAGE READING DEVICE, IMAGE FORMING APPARATUS, AND IMAGE READING METHOD

(71) Applicant: FUJI XEROX CO., LTD., Tokyo (JP)

(72) Inventor: Akira Yamazaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/812,522

(22) Filed: Jul. 29, 2015

(65) Prior Publication Data

US 2016/0277611 A1  Sep. 22, 2016

(30) Foreign Application Priority Data

Mar. 18, 2015  (JP) .................................. 2015-054186

(51) Int. Cl.
*H04N 1/04* (2006.01)
*H04N 1/00* (2006.01)

(52) U.S. Cl.
CPC ...... *H04N 1/00718* (2013.01); *H04N 1/00037* (2013.01); *H04N 1/00082* (2013.01); *H04N 1/00745* (2013.01); *H04N 1/00809* (2013.01); *H04N 2201/0094* (2013.01)

(58) Field of Classification Search
CPC ............ H04N 1/00718; H04N 1/00037; H04N 1/00082; H04N 1/00745; H04N 1/00809
USPC ................................ 358/488, 474, 497, 498
See application file for complete search history.

(56) References Cited

U.S. PATENT DOCUMENTS

| 5,191,438 A * | 3/1993 | Katsurada ............ G06K 9/3283 358/488 |
| 5,359,677 A * | 10/1994 | Katsurada ............ G06K 9/3283 358/488 |
| 2006/0039629 A1* | 2/2006 | Li ...................... H04N 1/00681 382/289 |
| 2010/0091037 A1* | 4/2010 | Banerjee .............. H04N 1/3877 345/649 |

FOREIGN PATENT DOCUMENTS

| JP | 2000-081787 A | 3/2000 |
| JP | 2003-084570 A | 3/2003 |
| JP | 2009-113875 A | 5/2009 |
| JP | 2010-021832 A | 1/2010 |
| JP | 2015-082716 | 4/2015 |

\* cited by examiner

*Primary Examiner* — Houshang Safaipour
(74) *Attorney, Agent, or Firm* — Oliff PLC

(57) ABSTRACT

An image reading device includes a reading member that reads an image of a document at a reading position that is set in a transport path of the document, a skew detector that detects an amount of skew of the document with respect to a transport direction of the document, a distortion detector that detects an amount of distortion in the document that has been read, the amount of distortion being a deviation, from a right angle, of an angle formed by a direction transverse to the transport direction of the document with the transport direction of the document, and an image correcting unit that rotates the image that has been read, in accordance with an amount that cancels the amount of skew detected by the skew detector, and corrects distortion of the read image in accordance with an amount that cancels the amount of distortion.

7 Claims, 14 Drawing Sheets

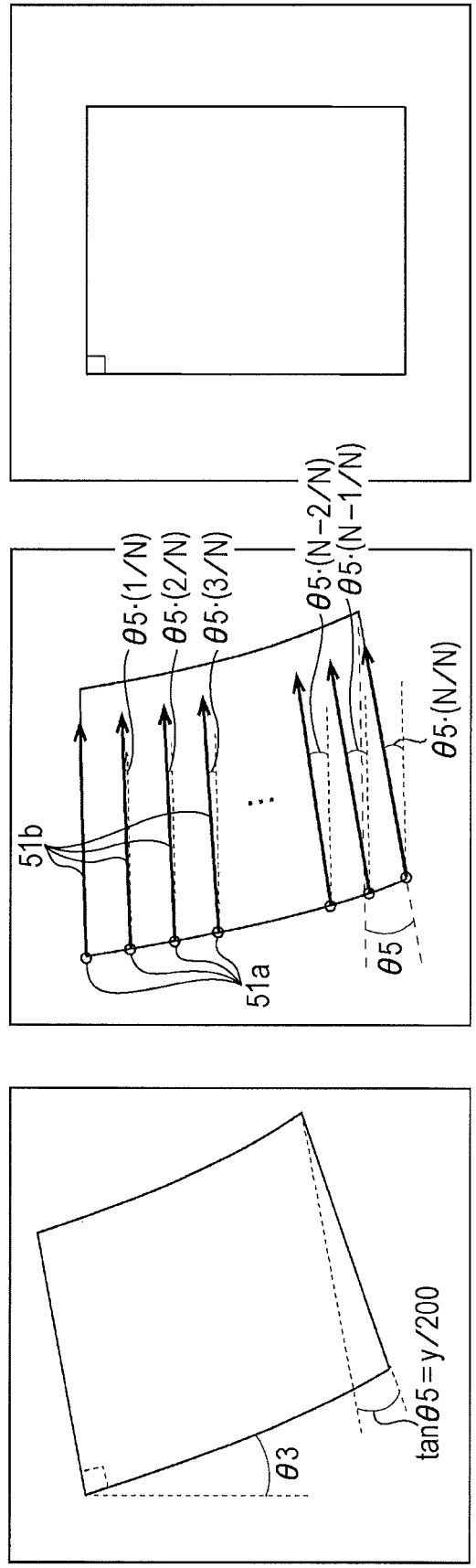

IMAGE READING DEVICE, IMAGE FORMING APPARATUS, AND IMAGE READING METHOD

CROSS-REFERENCE TO RELATED APPLICATIONS

This application is based on and claims priority under 35 USC 119 from Japanese Patent Application No. 2015-054186 filed Mar. 18, 2015.

BACKGROUND

Technical Field

The present invention relates to an image reading device, an image forming apparatus, and an image reading method.

SUMMARY

According to an aspect of the invention, there is provided an image reading device including a reading member that reads an image of a document at a reading position that is set in a transport path of the document, a skew detector that detects an amount of skew of the document with respect to a transport direction of the document, a distortion detector that detects an amount of distortion in the document that has been read, the amount of distortion being a deviation, from a right angle, of an angle formed by a direction transverse to the transport direction of the document with the transport direction of the document, and an image correcting unit that rotates the image that has been read, in accordance with an amount that cancels the amount of skew detected by the skew detector, and corrects distortion of the read image in accordance with an amount that cancels the amount of distortion.

BRIEF DESCRIPTION OF THE DRAWINGS

Exemplary embodiments of the present invention will be described in detail based on the following figures, wherein:

FIGS. 7A and 7B illustrate distortion correction according to Exemplary Embodiment 1, of which FIG. 7A illustrates a read image before distortion correction, and FIG. 7B illustrates a write image after distortion correction;

FIGS. 10A to 10C illustrate operation according to related art, of which FIG. 10A illustrates a read image before lead skew correction, FIG. 10B illustrates the read image illustrated in FIG. 10A that has been corrected for lead skew, and FIG. 10C illustrates a write image;

FIGS. 12A and 12B illustrate distortion correction according to Exemplary Embodiment 2, of which FIG. 12A illustrates a read image after side skew correction and before distortion correction, and FIG. 12B illustrates a write image after distortion correction;

FIGS. 15A to 15C illustrate distortion correction according to Exemplary Embodiment 3, of which FIG. 15A illustrates a read image before rotation, FIG. 15B illustrates a read image after rotation and before distortion correction, and FIG. 15C illustrates a write image after distortion correction.

DETAILED DESCRIPTION

Although specific examples of modes for carrying out the present invention (to be referred to as exemplary embodiments hereinafter) are described below with reference to the figures, the present invention is not limited to the exemplary embodiments below.

For the ease of understanding of the following discussion, in the figures, the front-rear direction is defined as X-axis direction, the left-right direction is defined as Y-axis direction, and the up-down direction is defined as Z-axis direction. Further, the directions or sides indicated by arrows X, -X, Y, -Y, Z, and -Z are defined as forward, rearward, rightward, leftward, upward, and downward directions, respectively, or as front, rear, right, left, upper, and lower sides, respectively.

Further, in each of the figures, a dot inside a circle represents an arrow pointing from the far side toward the near side of the plane of the figure, and a cross inside a circle represents an arrow pointing from the near side toward the far side of the plane of the figure.

In the figures used in the following discussion, for the ease of understanding, components other than those necessary for explanation are omitted as appropriate.

Exemplary Embodiment 1

Figure 1:
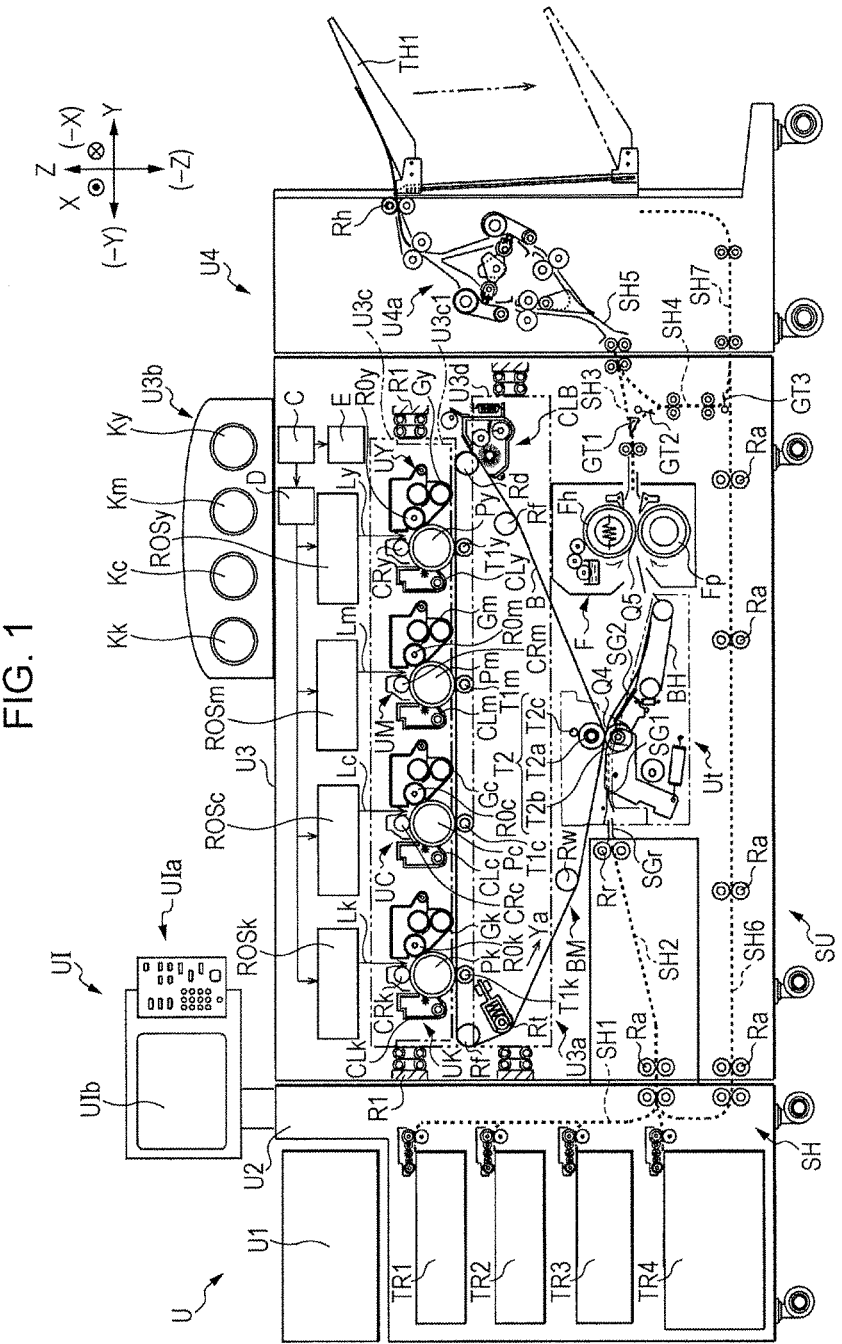
FIG. 1 illustrates an entire image forming apparatus according to Exemplary Embodiment 1 of the present invention.

FIG. 1 illustrates an entire image forming apparatus according to Exemplary Embodiment 1 of the present invention.

Figure 2:
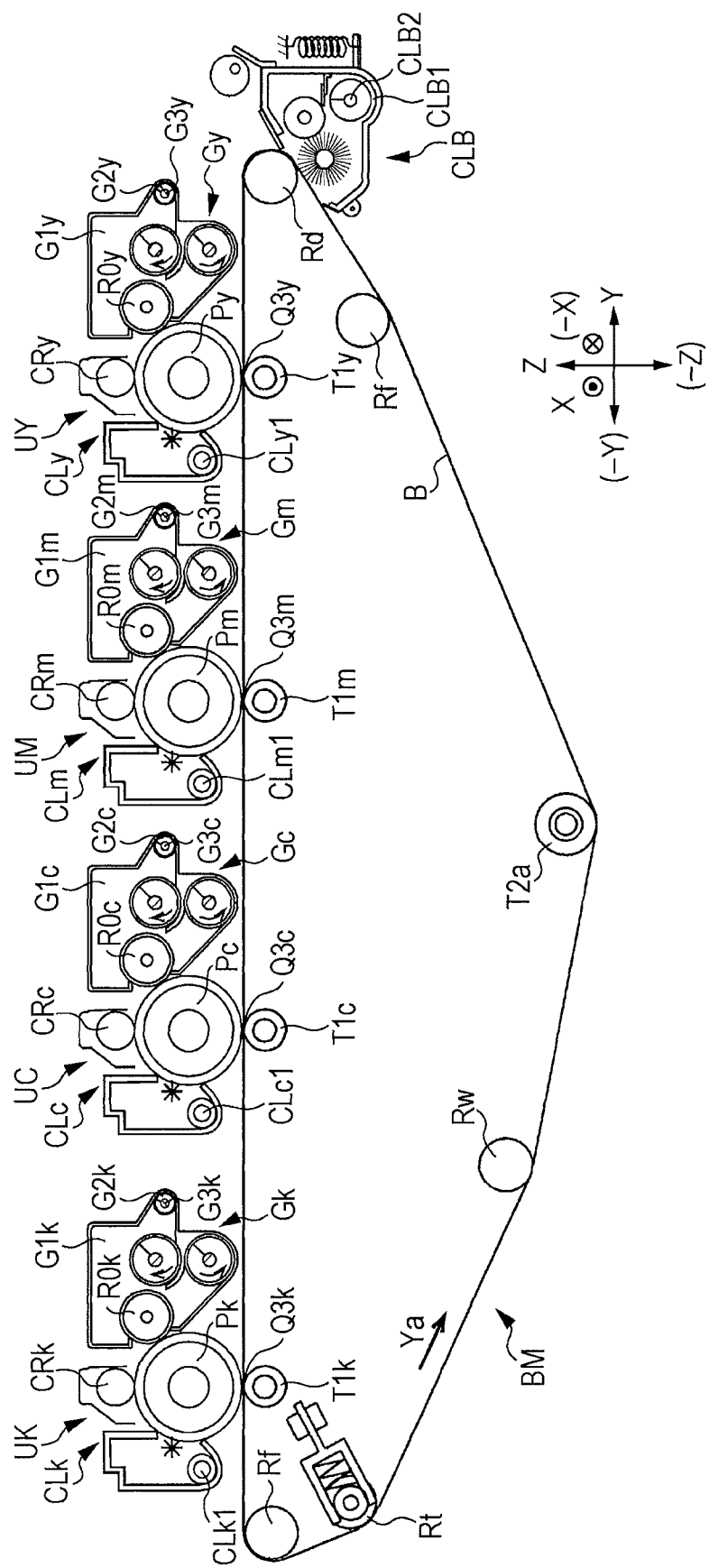
FIG. 2 is an enlarged illustration of a visible image forming device according to Exemplary Embodiment 1 of the present invention.

FIG. 2 is an enlarged illustration of a visible image forming device according to Exemplary Embodiment 1 of the present invention.

In FIG. 1, a copying machine U as an example of an image forming apparatus has an operating section UI, a scanner section U1 as an example of an image reading device, a feeder section U2 as an example of a medium supply device, an image forming section U3 as an example of an image recording device, and a medium processing device U4.

(Explanation of Operating Section UI)

The operating section UI has an input button UIa used to, for example, start copying or set the number of sheets to be copied. The operating section UI has a display UIb on which information input with the input button UIa, the state of the copying machine U, and the like are displayed.

(Explanation of Scanner Section U1)

Figure 3:
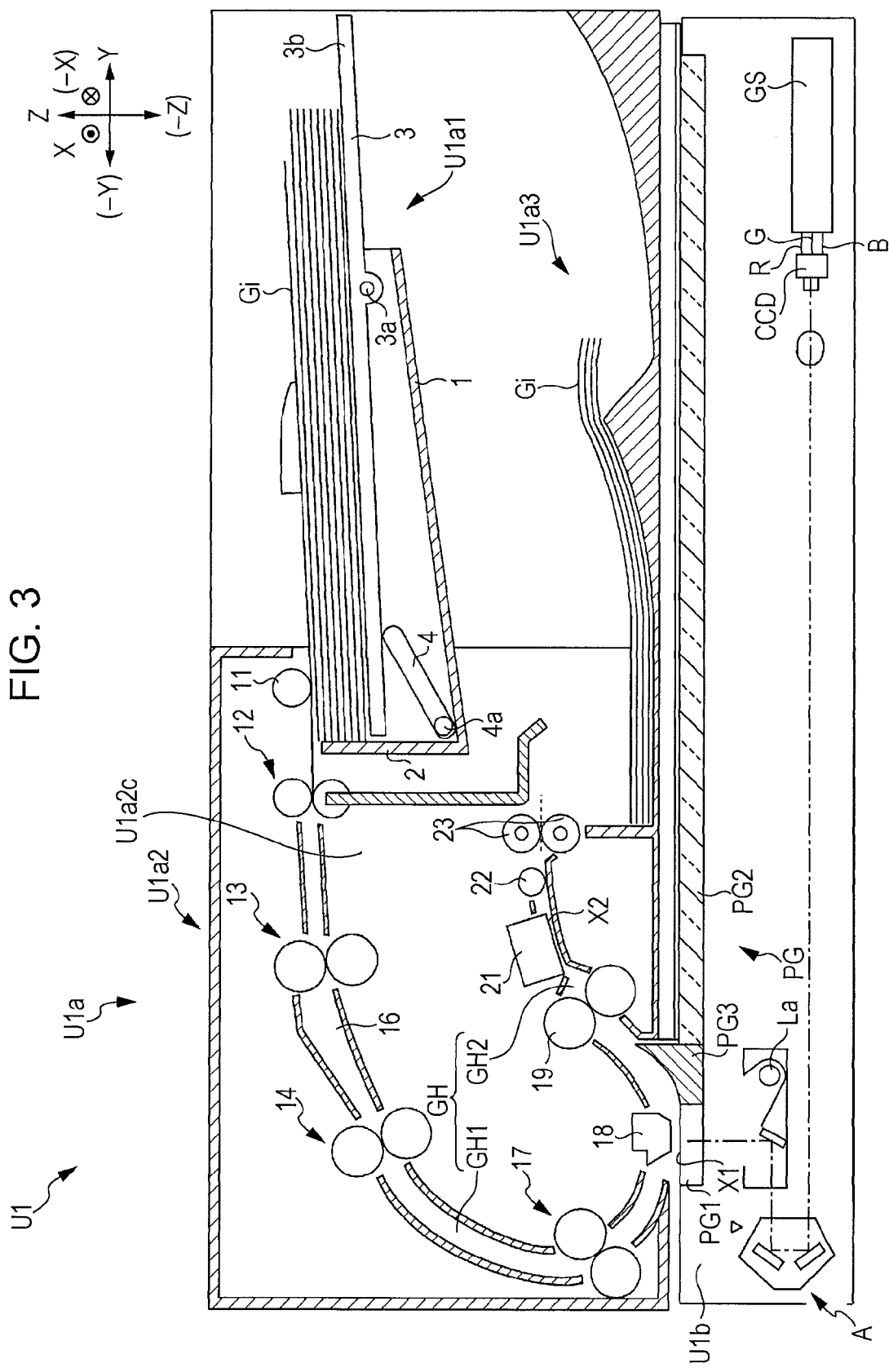
FIG. 3 illustrates an entire image reading device according to Exemplary Embodiment 1 of the present invention.

FIG. 3 illustrates an entire image reading device according to Exemplary Embodiment 1 of the present invention.

In FIGS. 1 and 3, the scanner section U1 has a scanner body U1b as an example of the body portion of the image reading device. The scanner body U1b has a transparent platen glass PG at the top end. A document transport device U1a is supported on the top side of the scanner body U1b in a manner that allows the document transport device U1a to open and close with respect to the platen glass PG.

The document transport device U1a has a document feed tray U1a1 as an example of a document loading section where multiple sheets of a document Gi to be copied are received in a stacked state. A document transport section U1a2 is located to the left of the document feed tray U1a1. The document transport section U1a2 transports the document Gi on the document feed tray U1a1 onto the platen glass PG. A document output tray U1a3 as an example of a document output section is disposed below the document feed tray U1a1. The document Gi that has passed over the platen glass PG is output to the document output tray U1a3 from the document transport section U1a2.

In FIG. 3, in a left end portion of the platen glass platen glass PG, a document passage surface PG1 as an example of a first reading surface is located at a position corresponding to a first image reading position X1 that is determined in advance. The document Gi transported by the document transport device U1a passes over the document passage surface PG1. A document placing surface PG2 is located to the right of the document passage surface PG1. The document Gi placed by the user is supported on the document placing surface PG2. A document guide PG3 as an example of a guide section is supported between the document passage surface PG1 and the document placing surface PG2. The document guide PG3 guides the document Gi that has passed over the document passage surface PG1 into the document transport device U1a.

An exposure optical system A is supported inside the scanner body U1b. The exposure optical system A has a lamp La as an example of a light source. The lamp La applies light to the document Gi passing over the document passage surface PG1, or to the document Gi placed on the document placing surface PG2. Light reflected from the document Gi is converted into an electrical signal in red (R), green (G), and blue (B) format by a solid-state imaging device CCD, which is an example of a first reading member, via multiple optical members of the exposure optical system A, before being input to an image processing section GS.

The image processing section GS converts the RGB electrical signal input from the solid-state imaging device CCD into image information for black K, yellow Y, magenta M, and cyan C, and temporarily stores this image information. The image processing section GS outputs the image information to a driving circuit D of a latent image forming device of the image forming section U3 at pre-set timing, as image information used for forming a latent image.

If the document image is a single-color image, that is, a so-called monochrome image, image information for only black K is input to the driving circuit D of the latent image forming device.

The platen glass PG, the exposure optical system A, the solid-state imaging device CCD, and the image processing section GS constitute the scanner body U1b according to Exemplary Embodiment 1.

(Explanation of Feeder Section U2)

In FIG. 1, the feeder section U2 has multiple paper feed trays TR1, TR2, TR3, and TR4 as an example of a medium receiving container. The feeder section U2 also has components such as a medium supply path SH1 along which a sheet S, which is as an example of an image recording medium received in the paper feed trays TR1 to TR4, is transported to the image forming section U3 after being taken out from each of the paper feed trays TR1 to TR4.

(Explanation of Image Forming Section U3 and Medium Processing Device U4)

Referring to FIG. 1, the image forming section U3 has an image recording section U3a that records an image on the sheet S transported from the feeder section U2, based on a document image read by the scanner section U1.

Referring to FIGS. 1 and 2, based on image information input from the scanner section U1, the driving circuit D of the latent image forming device of the image forming section U3 outputs corresponding driving signals to latent image forming devices ROSy, ROSm, ROSc, and ROSk for the colors Y, M, C, K, respectively, at preset timing. Photoconductor drums Py, Pm, Pc, and Pk as an example of an image carrier are disposed below the latent image forming devices ROSy, ROSm, ROSc, and ROSk, respectively. The surfaces of the photoconductor drums Py, Pm, Pc, and Pk that rotate are uniformly charged by charging rollers CRy, CRm, CRc, and CRk as an example of a charger, respectively. Electrostatic latent images are formed on the charged surfaces of the photoconductor drums Py to Pk by laser beams Ly, Lm, Lc, and Lk, which are an example of latent image-writing light output from the latent image forming devices ROSy, ROSm, ROSc, and ROSk, respectively. The electrostatic latent images on the surfaces of the photoconductor drums Py, Pm, Pc, and Pk are developed by developing devices Gy, Gm, Gc, and Gk into toner images of yellow Y, magenta M, cyan C, and black K as an example of a visible image, respectively.

In the developing devices Gy to Gk, as developer is consumed by development, developer is added from toner cartridges Ky, Km, Kc, and Kk as an example of developer containers which are detachably mounted to a developer adding device U3b. In Exemplary Embodiment 1, a two-component developer including a toner and a carrier is used as the developer. A so-called high density developer with a toner density higher than that in the developing devices Gy to Gk is added from the toner cartridges Ky, Km, Kc, and Kk. Accordingly, in the developing devices Gy to Gk according to Exemplary Embodiment 1, carrier replacement is performed by adding a high density developer containing a small amount of carrier while gradually discharging a developer containing a deteriorated carrier from the developing devices Gy to Gk. Since such techniques for gradually replacing the carrier are described in related art including Japanese Unexamined Patent Application Publication No. 2000-81787 and Japanese Unexamined Patent Application Publication No. 2003-84570, a detailed description is omitted in this regard.

In the developing devices Gy to Gk, as a developer containing a deteriorated carrier is discharged to the rear end portions of the developing devices Gy to Gk from deteriorated-developer discharge sections G1y to G1k, a developer containing a new carrier is added from the cartridges Ky to Kk, thereby gradually replacing the developer in the developing devices Gy to Gk by new developer. The developer discharged from the deteriorated-developer discharge sections G1y to G1k flows into deteriorated-developer transport paths G2y to G2k that extend rearward, and is then transported rearward by deteriorated-developer transport members G3y to G3k disposed in the deteriorated-developer transport paths G2y to G2k, respectively, before being recovered by a deteriorated-developer recovery section.

The toner images on the surfaces of the photoconductor drums Py, Pm, Pc, and Pk are successively superimposed and transferred by first transfer rollers T1y, T1m, T1c, and T1k, which are an example of a first transfer component, onto an intermediate transfer belt B, which is an example of an intermediate transfer body, in first transfer regions Q3y, Q3m, Q3c, and Q3k, respectively. Thus, a color toner image as an example of a multi-color visible image is formed on the intermediate transfer belt B. The color toner image formed on the intermediate transfer belt B is transported to a second transfer region Q4.

When there is only image information for the color K, only the photoconductor drum Pk and the developing device Gk for the color K are used so that only a toner image of the color K is formed.

After the first transfer, residues such as remaining developer and paper powder adhering on the surfaces of the photoconductor drums Py, Pm, Pc, and Pk are removed by drum cleaners CLy, CLm, CLc, and CLk, which are an example of a cleaner for an image carrier cleaner, respectively.

In Exemplary Embodiment 1, the photoconductor drum Pk, the charging roller CRk, and the drum cleaner CLk are integrated as a photoconductor unit UK for the color K as an example of an image carrier unit. As for other colors Y, M, and C, likewise, the photoconductor drums Py, Pm, and Pc, the charging rollers CRy, CRm, and CRc, and the drum cleaners CLy, CLm, and CLc constitute photoconductor units UY, UM, and UC, respectively.

The photoconductor unit UK for the color K, and the developing device Gk having a developing roller R0k, which is an example of a developer carrier, constitute a visible image forming device UK+Gk for the color K. Likewise, the photoconductor units UY, UM, and UC for the colors Y, M, and C, the developing devices Gy, Gm, and Gc having developing rollers R0y, R0m, and R0c constitute visible image forming devices UY+Gy, UM+Gm, and UC+Gc for the colors Y, M, and C, respectively.

A drawer U3c for a visible image forming device, which is an example of a drawing member, is disposed below the latent image forming devices ROSy, ROSm, ROSc, and ROSk for the colors Y to K, respectively. The drawer U3c for a visible image forming device is supported so as to be movable between a drawn position, in which the drawer U3c is drawn to the front of the image forming section U3, and a mounted position, in which the drawer U3c is mounted inside the image forming section U3, by slide rails R1 which are an example of a pair of left and right guide members.

The drawer U3c for a visible image forming device has a drawer body U3c1, which is an example of a holding section. The photoconductor units UY, UM, UC, and UK, and the developing devices Gy, Gm, Gc, and Gk are detachably mounted to the drawer body U3c1.

A drawer U3d for an intermediate transfer device, which is an example of a drawing member, is disposed below the drawer U3c for a visible image forming device. The drawer U3d for an intermediate transfer device is supported so as to be movable between a drawn position, in which the drawer U3d is drawn to the front of the image forming section U3, and a mounted position, in which the drawer U3d is mounted inside the image forming section U3. The drawer U3d for an intermediate transfer device supports a belt module BM, which is as an example of an intermediate transfer device, in a manner that allows the belt module M to be moved up and down between an elevated position, in which the belt module M is in contact with the lower surfaces of the photoconductor drums Py, Pm, Pc, and Pk, and a lowered position, in which the belt module M is located below and away from the lower surfaces.

The belt module BM has the intermediate transfer belt B, a driving roller Rd, which is an example of an intermediate transfer body driving member, a tension roller Rt, which is an example of a tension applying member, a walking roller Rw, which is an example of a meandering preventing member, multiple idler rollers Rf, which are an example of a driven member, a backup roller T2a, which is an example of an opposed member, and the first transfer rollers T1y, T1m, T1c, and T1k. The driving roller Rd, the tension roller Rt, the walking roller Rw, the idler roller Rf, and the backup roller T2a constitute a belt support roller Rd+Rt+Rw+Rf+T2a, which is an example of an intermediate transfer member supporting member. The intermediate transfer belt B is supported by the belt support roller Rd+Rt+Rw+Rf+T2a so as to be rotatable in the direction of an arrow Ya.

A second transfer unit Ut is disposed below the backup roller T2a. The second transfer unit Ut has a second transfer roller T2b as an example of a second transfer member. The second transfer roller T2b is disposed in a manner that allows the second transfer roller T2b to be separated from and brought into pressure contact with the backup roller T2a with the intermediate transfer belt B therebetween. The region where the second transfer roller T2b is in contact with the intermediate transfer belt B forms a second transfer region Q4. A contact roller T2c as an example of a power feeding member is in contact with the backup roller T2a. A second transfer voltage, which has the same polarity as the polarity of the charge on the toner, is applied to the contact roller T2c at predetermined timing from a power supply circuit E controlled by a control section C.

The backup roller T2a, the second transfer roller T2b, and the contact roller T2c constitute a second transfer component T2.

A medium transport path SH2 is disposed below the belt module BM. The sheet S fed from the medium supply path SH1 of the feeder section U2 is transported to a registration roller Rr which is an example of a transport timing regulating member, by a transport roller Ra which is an example of a medium transport member. The registration roller Rr transports the sheet S to the downstream side, in synchronism with the timing when a toner image formed on the intermediate transfer belt B is transported to the second transfer region Q4. The sheet S sent out by the registration roller Rr is guided by a registration-side sheet guide SGr and a pre-transfer sheet guide SG1, and transported to the second transfer region Q4.

The registration-side sheet guide SGr according to Exemplary Embodiment 1 is secured to the image forming section U3 together with the registration roller Rr.

A toner image on the intermediate transfer belt B is transferred to the sheet S by the second transfer component T2 as the toner image passes through the second transfer region Q4. In the case of a color toner image, toner images transferred to the surface of the intermediate transfer belt B in a superimposed manner by first transfer are transferred to the sheet S at once for second transfer.

The first transfer rollers T1y to T1k, the second transfer component T2, and the intermediate transfer belt B constitute transfer devices T1y+T2+B to T1k+T2+B according to Exemplary Embodiment 1, respectively.

The intermediate transfer belt B after the second transfer is cleaned by a belt cleaner CLB which is an example of an intermediate-transfer-body cleaner disposed downstream of the second transfer region Q4. The belt cleaner CLB removes, from the intermediate transfer belt B, residues such as developer and paper powder remaining on the intermediate transfer belt B without being transferred in the second transfer region Q4. In FIG. 2, the residues removed from the intermediate transfer belt B flow into a belt cleaner residue transport path CLB1, which is provided in a lower part inside the belt cleaner CLB and extends rearward. Then, the residues are transported by a belt cleaner residue transporting member CLB2 disposed in the belt cleaner residue transport path CLB1 to the rear side of the image forming section U3, and recovered by a deteriorated-developer recovery section (not illustrated).

The sheet S with the transferred toner image is guided by a post-transfer sheet guide SG2, and sent to a medium transport belt BH which is an example of a transport member. The medium transport belt BH transports the sheet S to a fixing device F.

The fixing device F has a heat roller Fh as an example of a heat member, and a pressure roller Fp as an example of a pressure member. The sheet S is transported to a fixing region Q5 where the heat roller Fh and the pressure roller Fp are in contact with each other. As the toner image on the sheet S passes through the fixing region Q5, heat and pressure is applied to the toner image by the fixing device F, thereby fixing the toner image to the sheet S.

The visible image forming devices UY+Gy to UK+Gk, the transfer devices T1y+T2+B to T1k+T2+B, and the fixing device F constitute the image recording section U3a according to Exemplary Embodiment 1.

A switching gate GT1 as an example of a switching member is provided downstream of the fixing device F. The switching gate GT1 selectively changes the transport path of the sheet S that has passed through the fixing region Q5, to either a discharge path SH3 located on the medium processing device U4 side or a reversing path SH4. The sheet S transported to the discharge path SH3 is transported to a sheet transport path SH5 of the medium processing device U4. A curl correcting member U4a as an example of a warpage correcting member is disposed in the sheet transport path SH5. The curl correcting member U4a corrects warpage, or so-called curl, of the sheet S transported to the curl correcting member U4a. The sheet S having its curl corrected is output by an output roller Rh which is an example of a medium output member, to a paper output tray TH1 which is an example of a medium output section, with the image-fixed surface of the paper facing up.

The sheet S transported toward the reversing path SH4 of the image forming section U3 by the switching gate GT1 is transported to the reversing path SH4 of the image forming section U3 via a second gate GT2 which is an example of a switching member.

At this time, to output the sheet S with its image-fixed surface facing down, the transport direction of the sheet S is reversed after the trailing edge in the transport direction of the sheet S passes through the second gate GT2. In this regard, the second gate GT2 according to Exemplary Embodiment 1 is made of a thin-film elastic member. Accordingly, the sheet S transported to the reversing path SH4 is once allowed to pass through the second gate GT2 as it is. Then, when the sheet S that has passed through the second gate GT2 is reversed, that is, switched back toward the second gate GT2, the second gate GT2 then guides the sheet S toward the transport path SH3 or SH5. Then, the sheet S that has been switched back passes through the curl correcting member U4a, and is output to the output tray TH1 with its image-fixed surface facing down.

A circulation path SH6 is connected to the reversing path SH4 of the image forming section U3. A third gate GT3 as an example of a switching member is disposed at the connection between the circulation path SH6 and the reversing path SH4. Further, the downstream end of the reversing path SH4 is connected to a reversing path SH7 of the medium processing device U4.

The sheet S transported to the reversing path SH4 through the switching gate GT1 is transported toward the reversing path SH7 of the medium processing device U4 by the third gate GT3. Like the second gate GT2, the third gate GT3 according to Exemplary Embodiment 1 is made of a thin-film elastic member. Accordingly, the sheet S transported to the reversing path SH4 is once allowed to pass through the second gate GT3. Then, when the sheet S that has passed through the third gate GT3 is switched back toward the third gate GT3, the third gate GT3 then guides the sheet S toward the transport path SH6.

The sheet S transported to the circulation path SH6 is sent through the medium transport path SH2 to the second transfer region Q4 again for printing on the second side of the sheet S.

The elements indicated by symbols SH1 to SH7 constitute the sheet transport path SH. Further, the elements indicated by symbols SH, Ra, Rr, Rh, SGr, SG1, SG2, BH, and GT1 to GT3 constitute a sheet transport device SU according to Exemplary Embodiment 1.

(Explanation of Document Transport Device U1a)

In FIG. 3, the document feed tray U1a1 of the document transport device U1a has a bottom portion 1, and a left wall 2 extending upward from the left end of the bottom portion 1. An elevating plate 3 as an example of an elevating member is supported on the bottom portion 1 so as to be rotatable about a center of rotation 3a. The top side of the elevating plate 3 is provided with a document loading surface 3b.

An elevating rod 4 as an example of a driving member used for ascending and descending movement is in contact with the lower surface of a left end portion of the elevating plate 3. A drive from a drive source (not illustrated) can be transmitted to a center of rotation 4a of the elevating rod 4. Accordingly, the left end of the elevating plate 3 moves up and down as the elevating rod 4 rotates.

A nudger roller 11 as an example of a document pickup member is disposed above the left end portion of the elevating plate 3. A document handling roller 12 as an example of a document handling member is disposed to the left of the nudger roller 11.

A document transport path GH, along which the document Gi is transported, is provided inside the document transport section U1a2. The document transport path GH has a first document transport path GH1 and a second document transport path GH2. The first document transport path GH1 is curved in an arcuate shape from the document handling roller 12 toward the first image reading position X1. The second document transport path GH2 extends from the first image reading position X1 to the document output tray U1a3.

In the first document transport path GH1, a document transport roller 13 as an example of a document transport member is disposed downstream of the document handling roller 12 in the document transport direction. A pre-registration roller 14 as an example of an inclination correcting member is disposed downstream of the document transport roller 13. In the first document transport path GH1 according to Exemplary Embodiment 1, a loop space 16, where the transport path is wider than in other portions, is provided between the document transport roller 13 and the pre-registration roller 14, as an example of a space for allowing a medium to curve.

A document registration roller 17 as an example of a document transport timing regulating member is disposed downstream of the pre-registration roller 14. A pad 18 as an example of a document hold-down member is disposed downstream of the document registration roller 17, at a position above the first image reading position X1.

In the second document transport path GH2, a document transport roller 19 as an example of a document transport member is provided downstream of the pad 18. On the downstream side of the document transport roller 19, an image reading sensor 21 as an example of a second reading member is disposed at a position corresponding to a second reading position X2 that is set in advance. The image reading sensor 21 according to Exemplary Embodiment 1 is implemented by a contact image sensor (CIS).

A reading roller 22 as an example of an auxiliary reading member is disposed downstream of the image reading sensor 21. A document output roller 23, which outputs the document Gi to the document output tray U1a3, is disposed downstream of the reading roller 22.

(Function of Document Transport Device U1a)

In the document transport device U1a having the above-mentioned structure, when the document Gi is to be read, as illustrated in FIG. 3, the elevating plate 3 moves up until the top side of the document Gi comes into contact with the nudger roller 11. Then, the nudger roller 11 rotates to send out the document Gi. The document Gi sent out by the nudger roller 11 is handled by the document handling roller 12 so as to be separated sheet by sheet. The document Gi that has been handled as described above is transported by the document transport roller 13 to the pre-registration roller 14. In the case of curving the document Gi to form a so-called loop at this time, the document is transported by the document transport roller 13 with the rotation of the pre-registration roller 14 being stopped. Accordingly, in the loop space 16, the document Gi is curved, and the leading edge of the document Gi brought into abutment against the pre-registration roller 14 is aligned. Then, after having its leading edge aligned, the document Gi is transported to the downstream side by the pre-registration roller 14. In cases where a loop is not to be formed, the document Gi sent by the document transport roller 13 is transported to the downstream side by the pre-registration roller 14.

The document Gi transported by the pre-registration roller 14 is transported to the first image reading position X1 by the document registration roller 17 at synchronized timing. As the document Gi passes through the first image reading position X1, its image is read by the solid-state imaging device CCD via the exposure optical system A.

The document Gi that has passed through the first image reading position X1 is transported by the document transport roller 19, and sent to the second image reading position X2. In the case of reading both sides of the document Gi, as the document Gi passes through the second image reading position X2, the image reading sensor 21 reads the side of the document Gi opposite to the side read by the solid-state imaging device CCD. In Exemplary Embodiment 1, while an image is read by the image reading sensor 21, the reading roller 22 holds down the document Gi, making it easy to keep the distance between the document Gi and the image reading sensor 21 stable. After passing through the second image reading position X2, the document Gi is output to the document output tray U1a3 by the document output roller 23.

(Explanation of Control Section According to Exemplary Embodiment 1)

Figure 4:
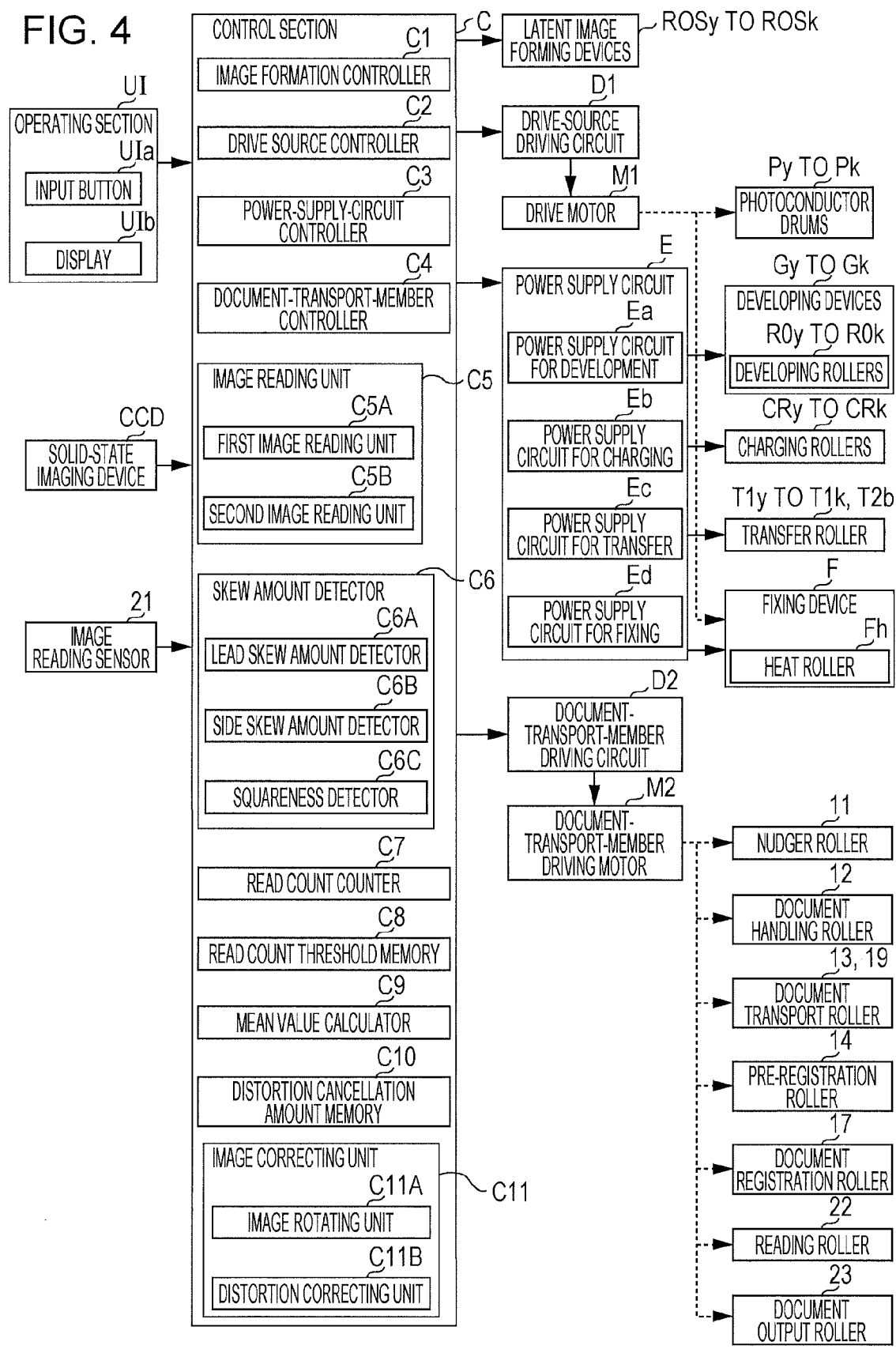
FIG. 4 is a block diagram of various functions included in a control portion of the image forming apparatus according to Exemplary Embodiment 1.

FIG. 4 is a block diagram illustrating various functions included in a control portion of the image forming apparatus according to Exemplary Embodiment 1.

In FIG. 4, the control section C of the image forming section U3 has an input/output interface I/O for inputting or outputting a signal from or to the outside. Further, the control section C has a read only memory (ROM) in which a program, information, and the like for performing necessary processing are stored. Further, the control section C has a random access memory (RAM) for temporarily storing necessary data. Further, the control section C has a central processing unit (CPU) that executes processing according to a program stored in the ROM or the like. Accordingly, the control section C according to Exemplary Embodiment 1 is implemented by a miniature information processor, that is, a so-called microcomputer. Therefore, the control section C is able to realize various functions by executing a program stored in the ROM or the like.

(Signal Output Elements Connected to Control Section C of Image Forming Section U3)

The control section C of the image forming section U3 receives an input of output signals from signal output elements such as the operating section UI, the solid-state imaging device CCD, and the image reading sensor 21.

The operating section UI includes, for example, the input button UIa for inputting the number of sheets to be printed, an arrow, and the like, and the display UIb.

The solid-state imaging device CCD reads an image of the first side of the document Gi passing through the first image reading position X1.

The image reading sensor 21 reads an image of the second side of the document Gi passing through the second image reading position X2.

(Controlled Elements Connected to Control Section C of Image Forming Section U3)

The control section C of the image forming section U3 is connected to a drive-source driving circuit D1, the power supply circuit E, a document-transport-member driving circuit D2, and other unillustrated controlled elements. The control section C outputs control signals to the corresponding circuits D1, D2, E, and the like.

D1: Drive-Source Driving Circuit

The drive-source driving circuit D1 rotationally drives components such as the photoconductor drums Py to Pk and the intermediate transfer belt B via a drive motor M1.

D2: Document-Transport-Member Driving Circuit

The document-transport-member driving circuit D2 causes components such as the nudger roller 11 and the document handling roller 12 to rotate via, for example, a document-transport-member driving motor M2, which is an example of a drive source, a gear train, and an electromagnetic clutch (not illustrated).

E: Power Supply Circuit

The power supply circuit E has components such as a power supply circuit for development Ea, a power supply circuit for charging Eb, a power supply circuit for transfer Ec, and a power supply circuit for fixing Ed.

Ea: Power Supply Circuit for Development

The power supply circuit for development Ea applies a developing voltage to each of the developing rollers of the developing devices Gy to Gk.

Eb: Power Supply Circuit for Charging

The power supply circuit for charging Eb applies a charging voltage for charging the surfaces of the photoconductor drums Py to Pk to the charging rollers CRy to CRk, respectively.

Ec: Power Supply Circuit for Transfer

The power supply circuit for transfer Ec applies a transfer voltage to each of the first transfer rollers T1y to T1k and the contact roller T2c.

Ed: Power Supply Circuit for Fixing

The power supply circuit for fixing Ed supplies the heat roller Fh of the fixing device F with electric power for heating by a heater.

(Function of Control Section C of Image Forming Section U3)

The control section C of the image forming section U3 has the function of executing processing according to signals input from the signal output elements, and outputting control signals to the controlled elements. That is, the control section C has the following functions.

C1: Image Formation Controller

The image formation controller C1 controls, for example, driving of various components of the copying machine U and the application timing of various voltages in accordance with image information input from the solid-state imaging device CCD of the scanner section U1 and the image reading sensor 21, thereby executing a job as an image forming operation.

C2: Drive Source Controller

The drive source controller C2 controls the drive of the drive motor M1 via the drive-source driving circuit D1, thereby controlling the drive of components such as the photoconductor drums Py to Pk.

C3: Power-Supply-Circuit Controller

The power-supply-circuit controller C3 controls the power supply circuits Ea to Ed to thereby control voltages applied to various components and electric power supplied to various components.

C4: Document-Transport-Member Controller

The document-transport-member controller C4 controls the drive of the nudger roller 11 and the like via the document-transport-member driving circuit D2. In the case of calculating a corrective rotation value described later, the document-transport-member controller C4 according to Exemplary Embodiment 1 controls the rollers 11 to 23 so as to form a loop, and in the case of performing normal reading of the document Gi, the document-transport-member controller C4 controls the rollers 11 to 23 so as not to form a loop. That is, the document-transport-member controller C4 operates in loop creation mode in the case of calculating a corrective rotation value, and operates in normal transport mode during normal document reading.

C5: Image Reading Unit

An image reading unit C5, which has a first image reading unit C5A and a second image reading unit C5B, reads an image of the document Gi by the scanner section U1.

C5A: First Image Reading Unit

The first image reading unit C5A reads an image of the first side of the document Gi passing through the first image reading position X1, based on an input from the solid-state imaging device CCD.

C5B: Second Image Reading Unit

The second image reading unit C5B reads an image of the second side of the document Gi passing through the second image reading position X2, based on an input from the image reading sensor 21.

Figure 5:
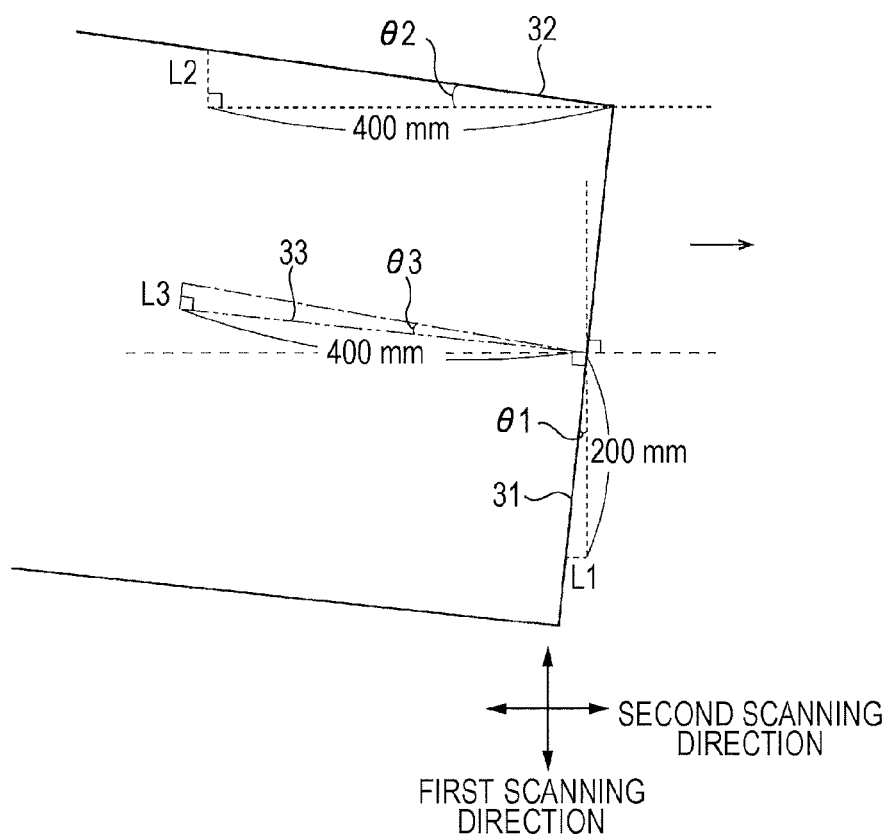
FIG. 5 illustrates amounts of skew according to Exemplary Embodiment 1.

FIG. 5 illustrates amounts of skew according to Exemplary Embodiment 1.

C6: Skew Amount Detector

A skew amount detector C6 as an example of a skew detector has a lead skew amount detector C6A, a side skew amount detector C6B, and a squareness detector C6C. The skew amount detector C6 measures an amount of skewing of the document Gi. In Exemplary Embodiment 1, as an example of amounts of skew, the skew amount detector C6 measures an amount of lead skew, which represents skew in a direction transverse to the direction of transport (to be referred to as "first scanning direction" hereinafter), an amount of side skew, which represents skew in a direction along the transport direction (to be referred to as "second scanning direction" hereinafter), and a squareness, which is a measure of how much an angle formed between the first and second scanning directions of a read image deviates from a right angle.

C6A: Lead Skew Amount Detector

The lead skew amount detector C6A, which is an example of a detector for detecting skew in the first scanning direction, detects an amount of the lead skew L1 based on the results of reading by the reading members CCD and 21. The lead skew amount detector C6A according to Exemplary Embodiment 1 detects an amount of inclination of a leading edge 31 of the document Gi. As illustrated in FIG. 5, the amount of the lead skew L1 is detected as an amount of deviation L1 [mm], with respect to the second scanning direction, of one end of the first scanning direction from the other end, relative to a width of 200 [mm] in the first scanning direction. Therefore, an angle of inclination $\theta1$ of the leading edge is represented by $\tan \theta1 = L1/200$.

C6B: Side Skew Amount Detector

The side skew amount detector C6B, which is an example of a detector for detecting skew in the second scanning direction, detects an amount of side skew L2 based on the results of reading by the reading members CCD and 21. The side skew amount detector C6B according to Exemplary Embodiment 1 detects an amount of inclination of a side edge 32 of the document Gi. The amount of side skew L2 is detected as an amount of deviation L2 [mm], with respect to the first scanning direction, of one end of the second scanning direction from the other end, relative to a width of 400 [mm] in the second scanning direction. Therefore, an angle of inclination $\theta2$ of the side edge is represented by $\tan \theta2 = L2/400$.

C6C: Squareness Detector

The squareness detector C6C detects the squareness L3 based on the results of reading by the reading members CCD and 21. The squareness detector C6C according to Exemplary Embodiment 1 detects the squareness L3 based on the amount of the lead skew L1 and the amount of side skew L2. The squareness L3 is detected as an amount of deviation L3 [mm] of one end from the other end with respect to the first scanning direction, relative to a width of 400 [mm] in a direction 33 perpendicular to the leading edge 31. Specifically, an angle of squareness deviation $\theta3$ is represented as $\theta3 = \theta2 - \theta1$, and hence satisfies Equation (1) below.

$$\tan\theta 3 = L3/400 \quad (1)$$
$$= \tan(\theta 2 - \theta 1)$$
$$= (\tan\theta 2 - \tan\theta 1)/\{1 + \tan\theta 2 \cdot \tan\theta 1\}$$

Therefore, from Equation (1), the squareness L3 can be calculated and detected by using Equation (2) below.

$$L3 = 400 \times (\tan\theta 2 - \tan\theta 1)/\{1 + \tan\theta 2 \tan\theta 1\} \quad (2)$$
$$= (-2 \times L1 + L2)/\{1 + (L1 \times L2)/80000\}$$
$$\approx (-2 \times L1 + L2)$$

Figure 6:
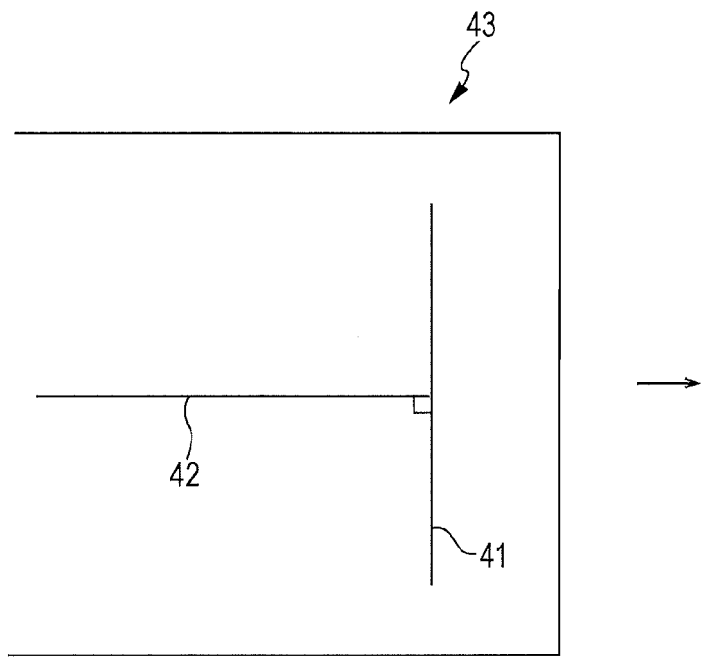
FIG. 6 illustrates an image used for correction, which is used to calculate a corrective rotation value according to Exemplary Embodiment 1.

FIG. 6 illustrates an image used for correction, which is used to calculate a corrective rotation value according to Exemplary Embodiment 1.

C7: Read Count Counter

A read count counter C7 counts the number of times N1 an image used for correction is read, in the case of calculating a distortion cancellation amount as an example of an image correction value. Referring to FIG. 6, in Exemplary Embodiment 1, an alignment chart 43, which is an example of a document used for skew correction and on which a line segment 41 and a line segment 42 are printed in advance, is used in the case of calculating a distortion cancellation amount L4 based on an input to the operating section UI. The line segment 41, which is an example of a first image portion, runs along the first scanning direction. The line segment 42, which is an example of a second image portion, runs along the second scanning direction and is perpendicular to the line segment 41 running along the first scanning direction.

C8: Read Count Threshold Memory

A read count threshold Na, which is a threshold for the number of times an image used for correction is read, is stored in a read count threshold memory C8. In Exemplary Embodiment 1, the read count threshold Na is set as Na=3 [times].

C9: Mean Value Calculator

A mean value calculator C9 as an example of a distortion detector calculates and detects a squareness deviation, which is an example of an image distortion amount, from the alignment chart 43. The mean value calculator C9 according to Exemplary Embodiment 1 detects, as a squareness deviation, the mean value <L3> of measured squareness deviations corresponding to the threshold Na [times].

C10: Distortion-Cancellation-Amount Memory

In a distortion cancellation amount memory C10, the distortion cancellation amount L4 used to cancel distortion of a read image is stored. In the distortion cancellation amount memory C10 according to Exemplary Embodiment 1, based on the mean value of squareness deviation <L3> calculated by the mean value calculator C9, a value obtained by reversing the positive and negative signs of this mean value is stored to cancel the deviation. That is, the following value is stored: L4=−<L3>

C11: Image Correcting Unit

An image correcting unit C11, which has an image rotating unit C11A and a distortion correcting unit C11B, corrects a read image.

C11A: Image Rotating Unit

When an image of the document Gi is read, the image rotating unit C11A rotates the image based on the amount of inclination θ1 of the document Gi so as to correct the inclination. Based on the amount of the lead skew L1 measured when an image of the document Gi is read, the image rotating unit C11A according to Exemplary Embodiment 1 rotates the image by a rotation angle −θ1 corresponding to −L1 that is an amount necessary to cancel the amount of lead skew.

Figure 7A:
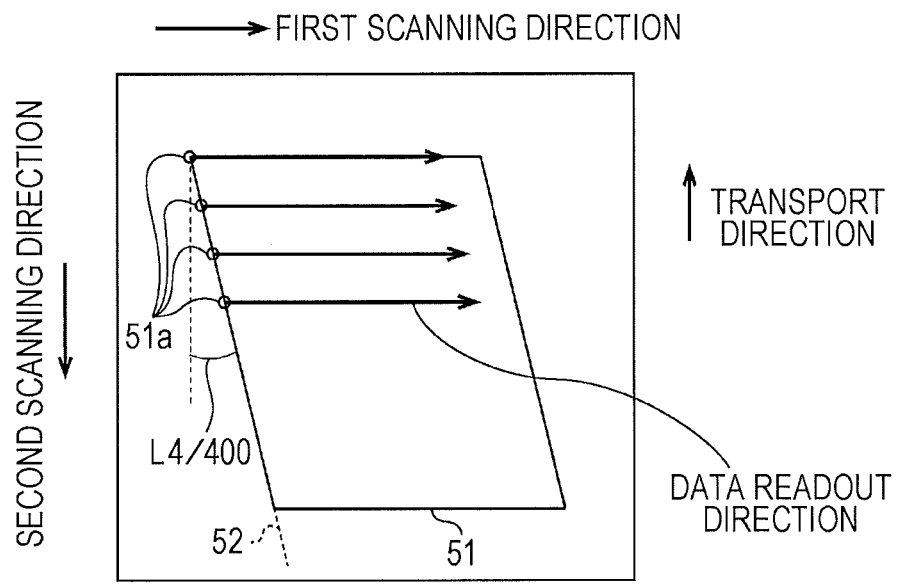
Figure 7B:
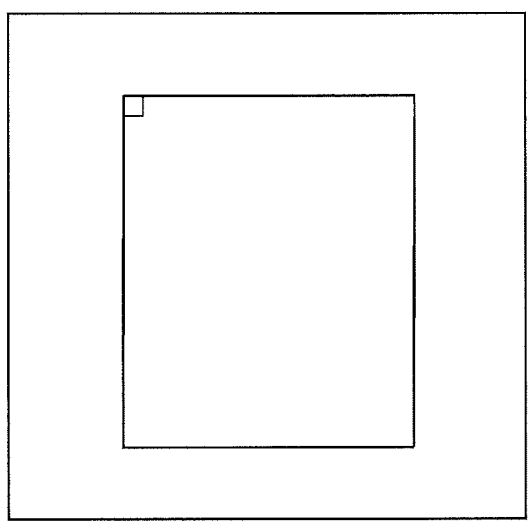

FIGS. 7A and 7B illustrate distortion correction according to Exemplary Embodiment 1, of which FIG. 7A illustrates a read image before distortion correction, and FIG. 7B illustrates a write image after distortion correction.

C11B: Distortion Correcting Unit

The distortion correcting unit C11B corrects distortion of a read document image based on the distortion cancellation amount L4. Specifically, the distortion correcting unit C11B according to Exemplary Embodiment 1 corrects distortion as follows. In a state where a read document image has been rotated by the image rotating unit C11A and corrected for lead skew, at the time of reading out an image of an image region 51 to a readout memory of the driving circuit D of the latent image forming device, the distortion correcting unit C11B shifts readout positions 51a progressively along the second scanning direction in accordance with the distortion cancellation amount L4. That is, the readout positions 51a are arranged along the second scanning direction at intervals set according to resolution. At this time, in the distortion correcting unit C11B, the readout positions 51a are set not in a direction perpendicular to the leading edge of the image region 51 but along an imaginary line 52 that is inclined in accordance with the distortion cancellation amount L4 with respect to the direction perpendicular to the leading edge.

(Explanation of Flow Diagram According to Exemplary Embodiment 1)

Next, a flow of control in the copying machine U according to Exemplary Embodiment 1 is described with reference to a flow diagram, that is, a so-called flowchart.

(Explanation of Flowchart of Distortion Cancellation Amount Calculating Process as Example of Corrective Rotation Value Calculating Process)

Figure 8:
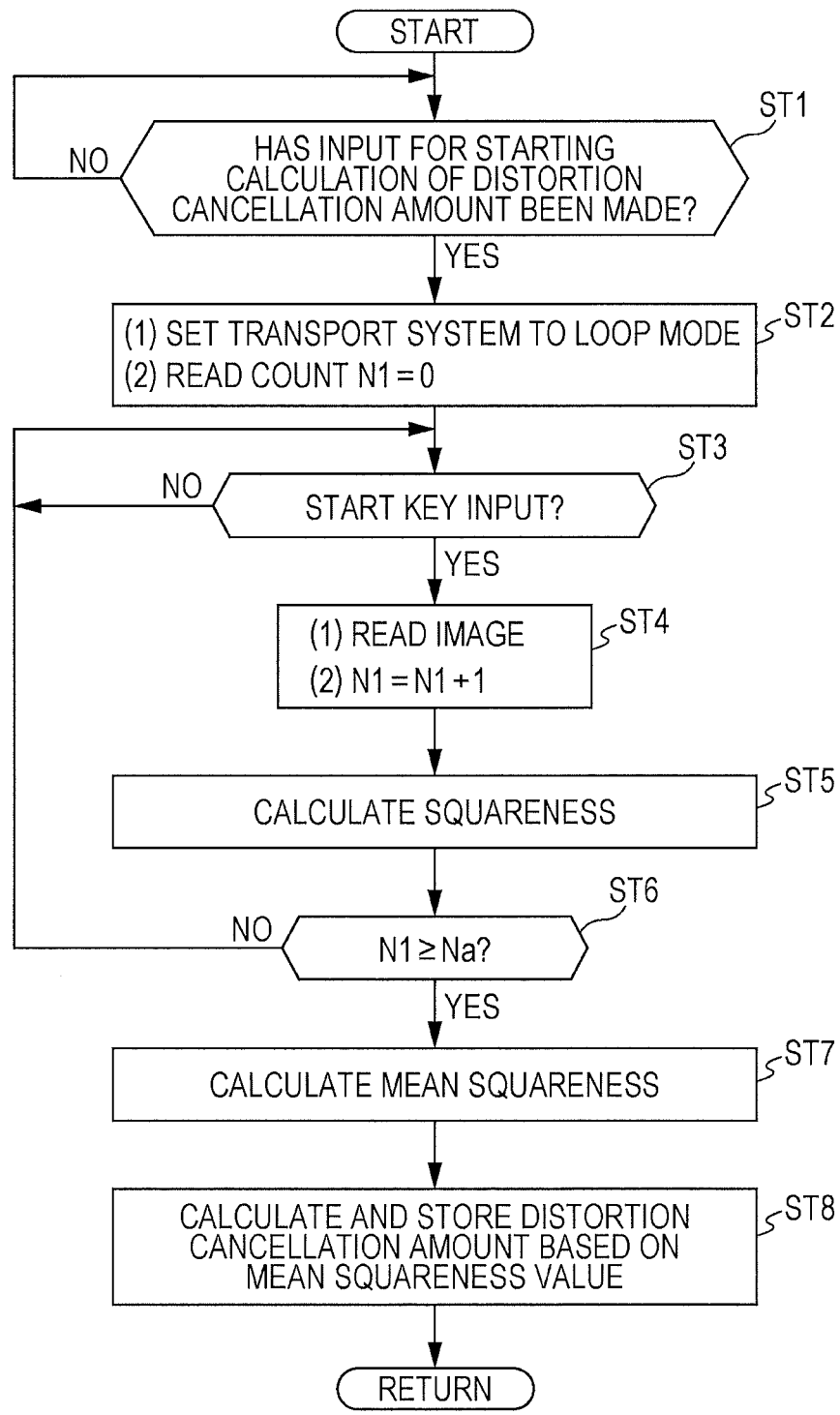
FIG. 8 is a flowchart illustrating a corrective rotation value calculating process according to Exemplary Embodiment 1.

FIG. 8 is a flowchart illustrating a corrective rotation value calculating process according to Exemplary Embodiment 1.

The processing in each of steps ST in the flowchart of FIG. 8 is executed in accordance with a program stored in the control section C of the copying machine U. Further, this processing is executed in parallel with various other kinds of processing executed in the copying machine U.

The flowchart illustrated in FIG. 8 is started upon turning on of power supply to the copying machine U.

In ST1 illustrated in FIG. 8, it is determined if an input for starting calculation of the distortion cancellation amount L4 has been made from the operating section UI. If Yes (Y), the processing proceeds to ST2. If No (N), ST1 is repeated.

In ST2, the following processes (1) and (2) are executed before proceeding to ST3.

(1) Transport of the alignment chart 43 by the rollers 11 to 23 is set to the loop creation mode.

(2) The read count N1 is initialized to 0.

In ST3, it is determined if an input of a start key, that is, an input for starting reading of the alignment chart 43, has been made from the operating section UI. If Yes (Y), the processing proceeds to ST4, and if No (N), ST3 is repeated.

In ST4, the following processes (1) and (2) are executed before proceeding to ST5.

(1) An image of the alignment chart 43 is read by the solid-state imaging device CCD.

(2) The read count N1 is incremented by 1. That is, the read count N1 is set as N1=N1+1.

In ST5, from a read image, the amount of the lead skew L1, the amount of side skew L2, and the squareness L3 are calculated and stored. Then, the processing proceeds to ST6.

In ST6, it is determined whether the read count N1 is greater than or equal to the read count threshold Na. If Yes (Y), the processing proceeds to ST7, and if No (N), the processing returns to ST3.

In ST7, based on the calculated squarenesses L3, the mean value <L3> of the squarenesses L3 is calculated. Then, the processing proceeds to ST8.

In ST8, based on the calculated mean squareness value <L3>, the distortion cancellation amount L4 is calculated and stored. Then, the processing returns to ST1.

(Explanation of Flowchart of Image Rotation Process During of Job Execution)

Figure 9:
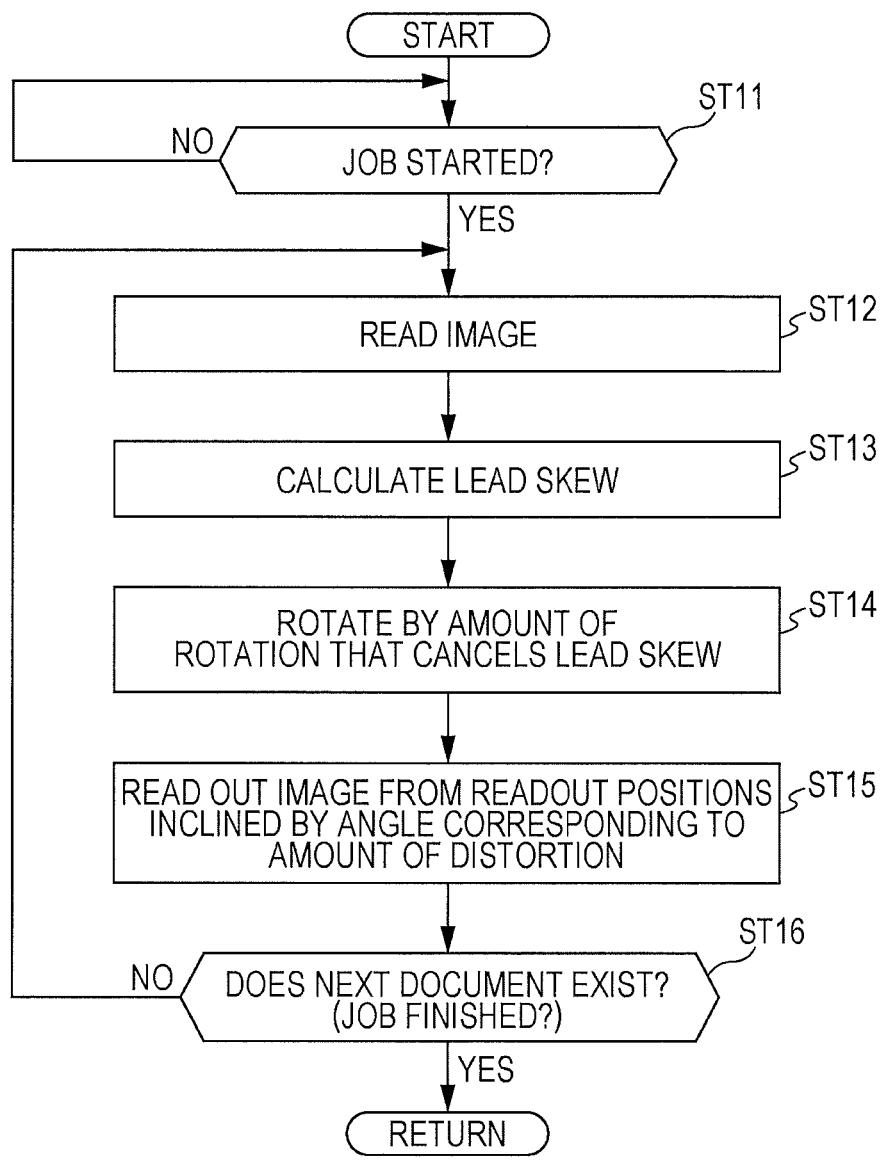
FIG. 9 is a flowchart illustrating an image rotation process during job execution according to Exemplary Embodiment 1.

FIG. 9 is a flowchart illustrating an image rotation process during job execution according to Exemplary Embodiment 1.

The processing in each of steps ST in the flowchart of FIG. 9 is executed in accordance with a program stored in the control section C of the copying machine U. Further, this processing is executed in parallel with various other kinds of processing executed in the copying machine U.

The flowchart illustrated in FIG. 9 is started upon turning on of power supply to the copying machine U.

In ST11 in FIG. 9, it is determined if a job as an image forming operation has been started by input of a Copy Start key on the operating section UI. If Yes (Y), the processing proceeds to ST12. If No (N), ST11 is repeated.

In ST12, an image of the document Gi is read based on an output from the solid-state imaging device CCD. Then, the processing proceeds to ST13.

In ST13, the amount of the lead skew L1 is calculated based on the image read by the solid-state imaging device CCD. Then, the processing proceeds to ST14.

In ST14, the image is rotated by an amount that cancels the lead skew, in accordance with the amount of the lead skew L1. Then, the processing proceeds to ST15.

In ST15, in accordance with the distortion cancellation amount L4, the image is read out sequentially from the readout positions 51a that are inclined by the cancellation amount L4 progressively along the second scanning direction. Then, the processing proceeds to ST16.

In ST16, it is determined if the next document Gi exists, that is, if the job in the scanner section U1 has been finished. If Yes (Y), the processing proceeds to ST11, and if No (N), the processing returns to ST12.

(Operation of Image Correcting Process)

In the case of the copying machine U according to Exemplary Embodiment 1 having the above-mentioned structure, if, at times such as inspection of the copying machine U prior to factory shipment and maintenance check on the copying machine U, the operator operates the operating section UI to make an input for executing calculation of the distortion cancellation amount L4, a process of deriving the distortion cancellation amount L4 is executed. When the process for deriving the distortion cancellation amount L4 is started, the alignment chart 43 for which the first and second scanning directions and squareness are set in advance is read. At this time, the alignment chart 43 is transported in loop creation mode. Thus, at the image reading positions X1 and X2, the leading edge is aligned with the first scanning direction.

At this time, presence of an optical axis misalignment in the first scanning direction, a manufacturing error, a mounting error, a distortion, or the like in the solid-state imaging device CCD causes lead skew to occur at the time of reading the first side of the document Gi. Further, lead skew or side skew occurs if the alignment chart 43 is sent in an oblique orientation or rotates owing to the presence of eccentricity, manufacturing errors, or the like in components such as the pre-registration roller 14 and the document registration roller 17. These factors may sometimes combine to also cause the squareness to deviate from a right angle. Lead skew or side skew caused by factors such as optical axis misalignment varies with each individual copying machine U.

Figure 10:
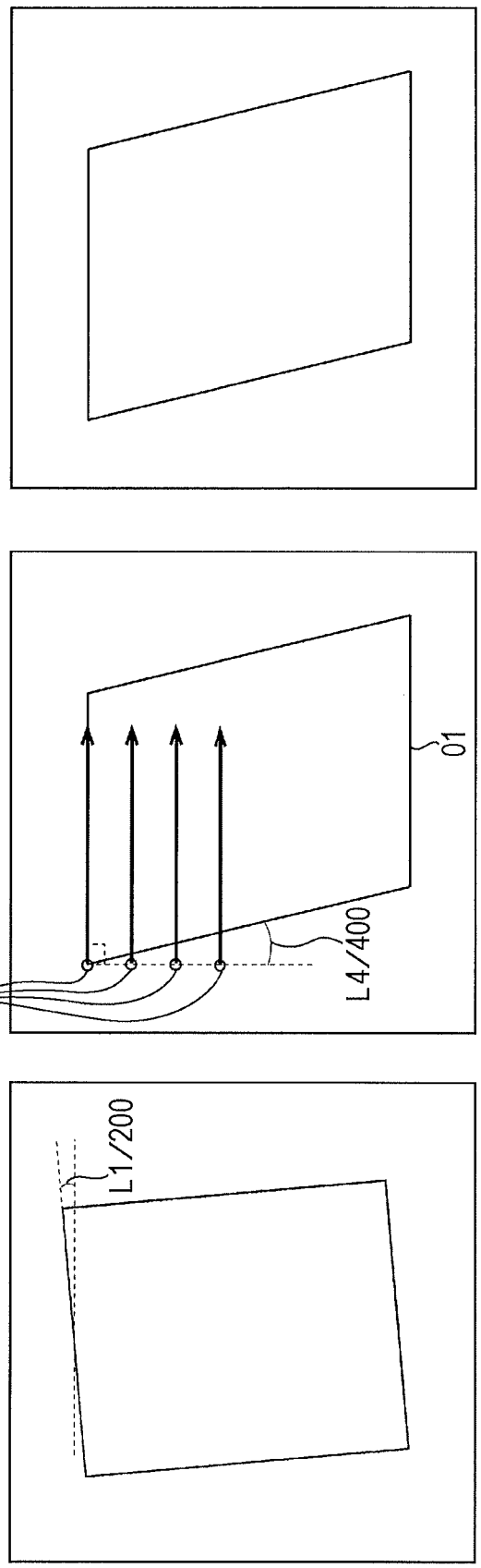

FIGS. 10A to 10C illustrate operation according to related art, of which FIG. 10A illustrates a read image before lead skew correction, FIG. 10B illustrates the read image illustrated in FIG. 10A that has been corrected for lead skew, and FIG. 10C illustrates a write image.

Techniques described in Japanese Unexamined Patent Application Publication No. 2010-21832 ([0055] to [0065]) and Japanese Unexamined Patent Application Publication No. 2009-113875 ([0018] to [0019], FIG. 5) exist as techniques which, at the time of reading an image recorded on a document, reduce reading of the image in a skewed direction. Japanese Unexamined Patent Application Publication No. 2010-21832 describes the following technique. That is, when a document (P) is transported from a document reading device (200), the leading edge of the document is brought into abutment against the nip part of a pair of rollers (R3) and bent into a loop (B), thereby transporting and reading the document in a state in which the side along the leading edge of the document is not skewed with respect to the transport direction. Japanese Unexamined Patent Application Publication No. 2009-113875 describes a technique with which the leading edge of the document being transported is detected by a document edge sensor (15) to calculate the amount of skewing in a first scanning direction of the document.

Merely correcting lead skew of a document as in Japanese Unexamined Patent Application Publication No. 2010-21832 results in an image being read in the state as illustrated in FIG. 10B. In related art, readout positions 02 for reading the image of an image region 01 are set in a direction at right angles to the leading edge. Consequently, as illustrated in FIG. 10C, squareness deviation is not corrected, resulting in a distorted image being printed. In the case of detecting an amount of skewing as described in Japanese Unexamined Patent Application Publication No. 2009-113875, after the image illustrated in FIG. 10A is read, the image is rotated in the opposite direction in accordance with the amount of skewing so as to remove lead skew. This results in the state as illustrated in FIG. 10B, making it impossible to correct squareness deviation as in Japanese Unexamined Patent Application Publication No. 2010-21832.

In this regard, in Exemplary Embodiment 1, as illustrated in FIG. 7A, the image is read from the readout positions 51a located on the imaginary line 52 that is inclined from a right angle in accordance with the distortion cancellation amount L4. Therefore, a distortion-corrected image is printed as illustrated in FIG. 7B.

Exemplary Embodiment 2

Figure 11:
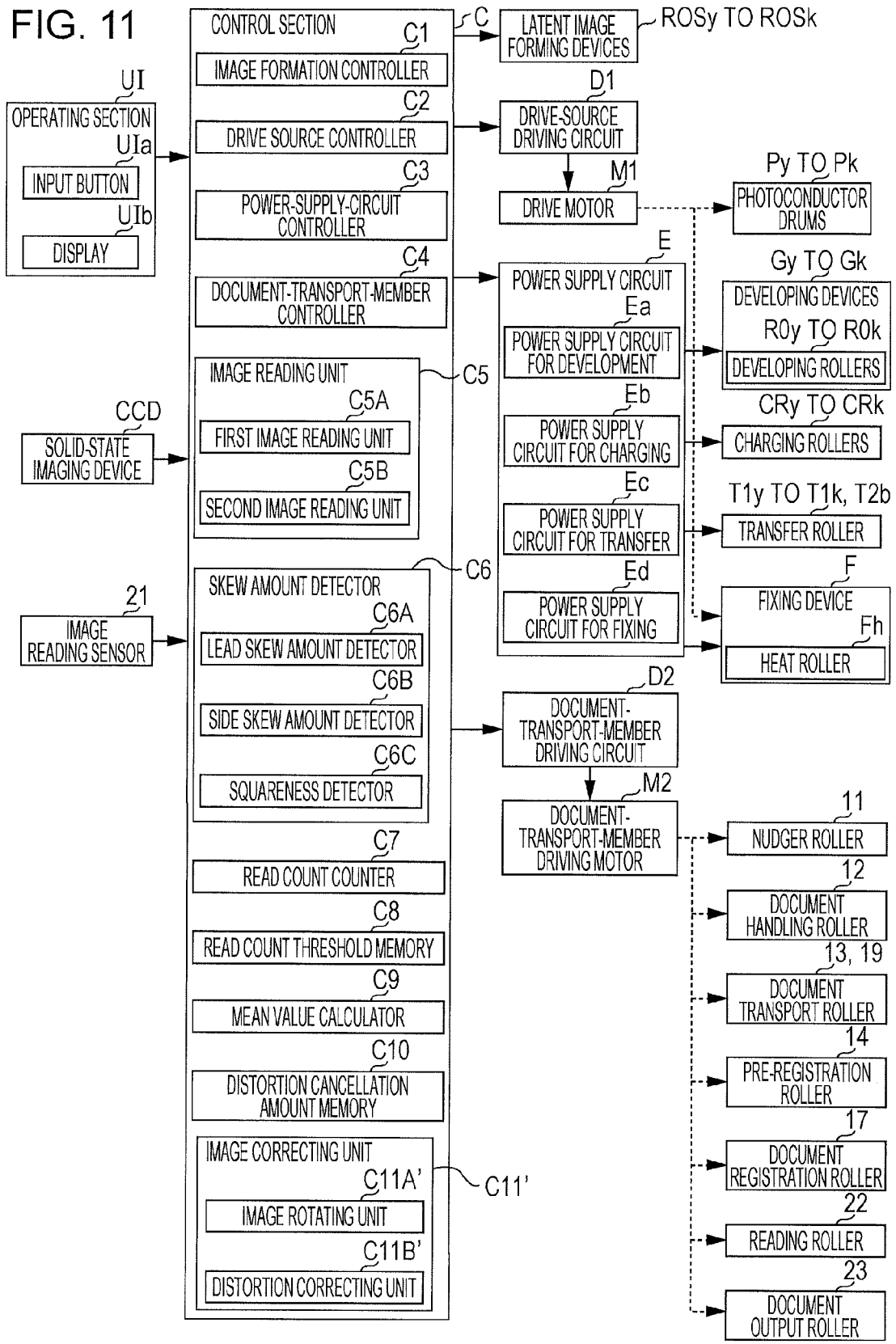
FIG. 11 is a block diagram according to Exemplary Embodiment 2, corresponding to FIG. 4 according to Exemplary Embodiment 1.

FIG. 11 is a block diagram according to Exemplary Embodiment 2, corresponding to FIG. 4 according to Exemplary Embodiment 1.

Exemplary Embodiment 2 of the present invention is described next. In the following description according to Exemplary Embodiment 2, components corresponding to those in Exemplary Embodiment 1 above are denoted by the same symbols, and a detailed description of those components is omitted.

Although Exemplary Embodiment 2 differs from Exemplary Embodiment 1 in the following respects, Exemplary Embodiment 2 is otherwise the same as Exemplary Embodiment 1 above.

In FIG. 11, the copying machine U according to Exemplary Embodiment 2 has an image correcting unit C11' instead of the image correcting unit C11 according to Exemplary Embodiment 1.

C11': Image Correcting Unit

An image correcting unit C11', which has an image rotating unit C11A' and a distortion correcting unit C11B', corrects a read image.

C11A': Image Rotating Unit

When an image of the document Gi is read, the image rotating unit C11A' rotates the image based on the amount of inclination θ2 of the document Gi so as to correct the inclination. Based on the amount of side skew L2 measured when an image of the document Gi is read, the image rotating unit C11A' according to Exemplary Embodiment 2 rotates the image by a rotation angle −θ2 corresponding to −L2 that is an amount necessary to cancel the amount of side skew.

Figure 12A:
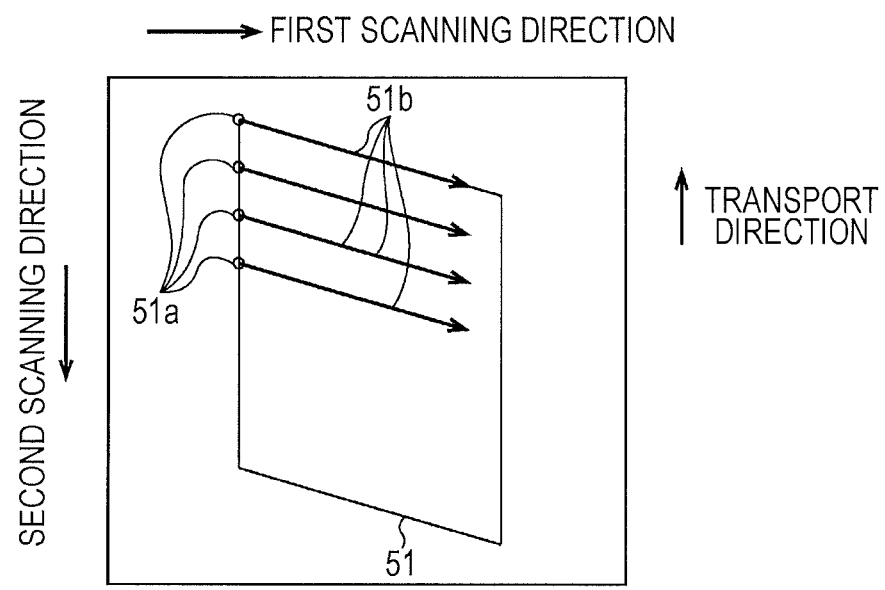
Figure 12B:
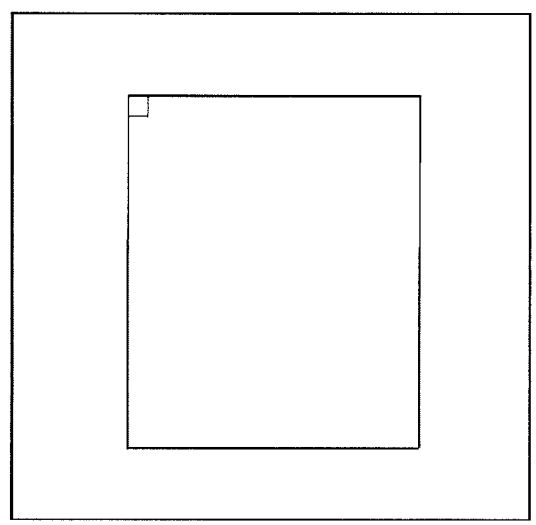

FIGS. 12A and 12B illustrate distortion correction according to Exemplary Embodiment 2, of which FIG. 12A illustrates a read image after side skew correction and before distortion correction, and FIG. 12B illustrates a write image after distortion correction.

C11B': Distortion Correcting Unit

The distortion correcting unit C11B' corrects distortion of a read document image based on the distortion cancellation amount L4. The distortion correcting unit C11B' according to Exemplary Embodiment 2 corrects distortion as follows. In a state where a read document image has been rotated by the image rotating unit C11A' and corrected for side skew, at the time of reading out an image of the image region 51 to the readout memory of the driving circuit D of the latent image forming device, the distortion correcting unit C11B' sets the readout direction to a readout direction 51b that is inclined in accordance with the distortion cancellation amount L4. That is, in the distortion correcting unit C11B' according to Exemplary Embodiment 2, with respect to the second scanning direction, the readout positions 51a are set at intervals according to resolution, along a direction perpendicular to the leading edge of the image region 51. At this time, the direction in which the image is read (first scanning direction) is set not to a direction perpendicular to the second scanning direction but along the readout direction 51b that is inclined in accordance with the distortion cancellation amount L4.

Exemplary Embodiment 2 is the same as Exemplary Embodiment 1 except for that, in accordance with the processing in the image correcting unit C11', the process of ST14 in FIG. 9 according to Exemplary Embodiment 1 is changed to a process of rotating the image by an amount that cancels side skew, and that the process of ST15 is changed to a process of reading out the image along the readout direction 51b that is inclined by an angle corresponding to the amount of distortion. Accordingly, illustration of a flowchart and a further detailed description are not provided for Exemplary Embodiment 2.

Exemplary Embodiment 3

Figure 13:
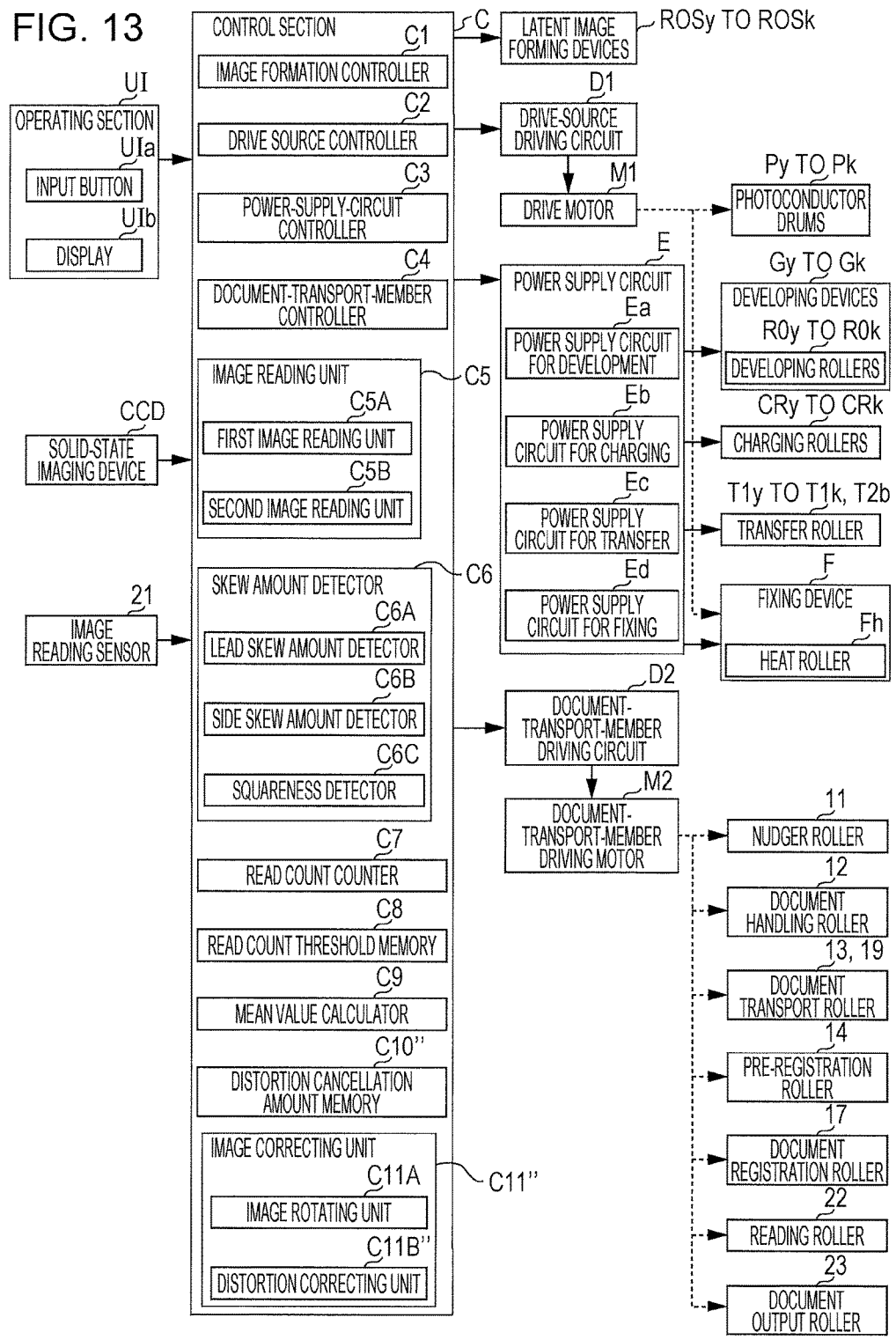
FIG. 13 is a block diagram according to Exemplary Embodiment 3, corresponding to FIG. 4 according to Exemplary Embodiment 1.

FIG. 13 is a block diagram according to Exemplary Embodiment 3, corresponding to FIG. 4 according to Exemplary Embodiment 1.

Figure 14:
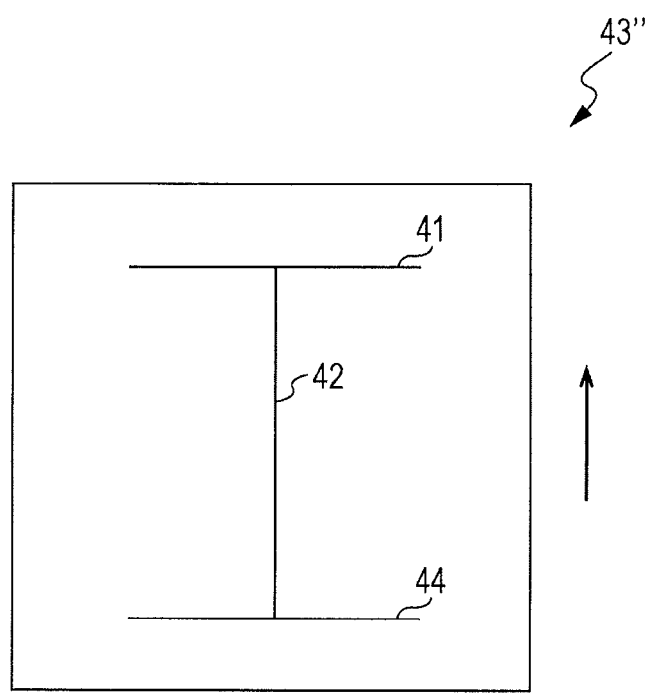
FIG. 14 illustrates a document used for skew correction according to Exemplary Embodiment 3, corresponding to FIG. 6 according to Exemplary Embodiment 1.

FIG. 14 illustrates a document used for skew correction according to Exemplary Embodiment 3, corresponding to FIG. 6 according to Exemplary Embodiment 1.

Exemplary Embodiment 3 of the present invention is described next. In the following description according to Exemplary Embodiment 3, components corresponding to those in Exemplary Embodiment 1 above are denoted by the same symbols, and a detailed description of those components is omitted.

Although Exemplary Embodiment 3 differs from Exemplary Embodiment 1 in the following respects, Exemplary Embodiment 3 is otherwise the same as Exemplary Embodiment 1 above.

In FIG. 13, a copying machine U according to Exemplary Embodiment 3 has a distortion cancellation amount memory C10" and an image correcting unit C11", instead of the distortion cancellation amount memory C10 and the image correcting unit C11 according to Exemplary Embodiment 1, respectively. Further, referring to FIG. 14, an alignment chart 43" is used in Exemplary Embodiment 3. Unlike the alignment chart 43 according to Exemplary Embodiment 1, the alignment chart 43" has, at the trailing edge in the transport direction of the document Gi, a line segment 44 extending along the first scanning direction.

C10": Distortion Cancellation Amount Memory

In the distortion cancellation amount memory C10", the distortion cancellation amount L4 used to cancel the distortion of a read image, and an amount of change in distortion y are stored. In the distortion cancellation amount memory C10" according to Exemplary Embodiment 3, from the mean value of squareness deviation <L3a> calculated by the mean value calculator C9 based on the line segment 41 at the leading edge and the line segment 42 extending along the second scanning direction, a value obtained by reversing the positive and negative signs of this mean value to cancel the deviation is stored as the distortion cancellation amount L4. That is, the following value is stored: L4=−<L3a>. Further, from the mean value of lead skew amount <L3b> calculated from the mean value calculator C9 based on the amount of the lead skew L1 of the line segment 42 at the leading edge and the amount of the lead skew L1" of the line segment 44 at the trailing edge, an amount of change in distortion y=<L3b>=<L1"−L1> is obtained and stored.

C11": Image Correcting Unit

An image correcting unit C11" has the same image rotating unit C11A as that in Exemplary Embodiment 1, and a distortion correcting unit C11B" different from that in Exemplary Embodiment 1. The image correcting unit C11" corrects a read image. Since the image rotating unit C11A is the same as that in Exemplary Embodiment 1, a description of the image rotating unit C11A is omitted.

FIGS. 15A to 15C illustrate distortion correction according to Exemplary Embodiment 3, of which FIG. 15A illustrates a read image before rotation, FIG. 15B illustrates a read image after rotation and before distortion correction, and FIG. 15C illustrates a write image after distortion correction.

C11B": Distortion Correcting Unit

The distortion correcting unit C11B" corrects distortion of a read document image, based on the distortion cancellation amount L4 and the amount of change in distortion y. The distortion correcting unit C11B" according to Exemplary Embodiment 3 corrects distortion as follows. In a state where a read document image has been rotated by the image rotating unit C11A and corrected for lead skew, that is, in the state as illustrated in FIG. 15B, at the time of reading out an image of the image region 51 to the readout memory of the driving circuit D of the latent image forming device, the distortion correcting unit C11B" shifts the readout positions 51a progressively along the second scanning direction in accordance with the distortion cancellation amount L4, and also sets the readout direction 51b, which is a direction in which the image of the image region 51 is read out, to the readout direction 51b that is inclined in accordance with the amount of change in distortion y. In Exemplary Embodiment 3, an angle θ6, which is formed between the first scanning direction and the readout direction 51b at the readout position 51a located at the n-th position from the leading edge in the transport direction of the document Gi along the second scanning direction, is set by Equation (3) below:

$$\theta 6 = 5 \times (n/N) \quad (3)$$

where N denotes the total number of the readout positions 51a along the second scanning direction, and θ5 denotes the angle of the change in distortion y.

In Exemplary Embodiment 3, in accordance with the processing of the distortion cancellation amount memory C10", the amount of change in distortion y is stored in addition to the distortion cancellation amount L4 in ST8 in FIG. 8 according to Exemplary Embodiment 1. Further, in accordance with the processing of the image correcting unit C11", the process of ST15 in FIG. 9 according to Exemplary Embodiment 1 is changed to a process of reading out an image from the readout positions 51a corresponding to the distortion cancellation amount L4, along the readout direction 51b inclined by an angle corresponding to the amount of change in distortion y. Since processes other than those mentioned above are the same as the above exemplary embodiments, illustration of a flowchart and a further detailed description are not provided for Exemplary Embodiment 3.

MODIFICATIONS

While exemplary embodiments of the present invention have been described above in detail, the present invention is not limited to the above exemplary embodiments but various modifications are possible within the scope of the invention as defined in the claims. Exemplary modifications (H01) to (H09) of the present invention are given below.

(H01) While the above exemplary embodiments are directed to an example in which the image forming apparatus is implemented as the copying machine U, this is not to be construed restrictively. The exemplary embodiments are also applicable to, for example, multi-function machines with multiple functions, such as those including the functions of a copying machine as well as a printer, a facsimile, and the like.

(H02) While the above exemplary embodiments are directed to an example in which the copying machine U includes the document transport device U1a, the exemplary embodiments are also applicable to a structure in which the image forming section U3 including the image recording section U3a, the feeder section U2, and the medium processing device U4 are omitted from the copying machine U. That is, the copying machine U may be made up of the scanner section U1 alone, that is, only a scanner.

(H03) While the above exemplary embodiments are directed to an example in which an alignment chart prepared in advance is used as the alignment chart 43 or 43", this is not to be construed restrictively. For example, it is also possible to use a chart printed out by the image forming section U3. In this case, squareness deviation may sometimes be introduced by factors such as tolerances, wear, and errors of components such as transport members and image carriers inside the image forming section U3, resulting in a distorted image being printed out. If such a distorted image is read to set the distortion cancellation amount L4 and the like, the squareness deviation in the image forming section U3 and the squareness deviation in the scanner section U1 or the feeder section U2 have the same value. Therefore, using the distortion cancellation amount L4 described above makes it possible to also correct the squareness deviation in the image forming section U3 at once.

It is also possible to selectively use different distortion cancellation amounts for different operation modes. For example, at the time of scanning or facsimile transmission, a distortion cancellation amount set by using the alignment chart 43 or 43" prepared in advance and having no distortion may be used, and at the time of copying, a distortion cancellation amount set by using a chart printed out by the image forming section U3 may be used.

(H04) While the above exemplary embodiments are directed to an example in which both sides of the document Gi can be read as the document Gi passes through the document transport path GH, this is not to be construed restrictively. For example, after having its first side read by the CCD, the document Gi may be switched back in the document output tray U1a3 so that its front and back sides are reversed, and then the second side may be also read by the CCD.

(H05) While the above exemplary embodiments are directed to an example in which a rotation for correcting lead skew is performed in Exemplary Embodiment 3, it is also possible to perform a rotation for correcting side skew as in Exemplary Embodiment 2.

(H06) The above exemplary embodiments are directed to an example in which the alignment chart is bent to align its leading edge to ensure that the alignment chart is not skewed, and at the time of normal document reading, the alignment chart is not curved to allow faster reading speed. However, this is not to be construed restrictively. For example, a loop may not be formed even in the case of using an alignment chart, or a loop may be formed in the document Gi at the time of normal document reading.

(H07) While the above exemplary embodiments use an alignment chart in which the line segment 41 along the first scanning direction and the line segment 42 along the second scanning direction are provided in advance, this is not to be construed restrictively. For example, the front and side edges of the sheet S may be used.

(H08) While the above exemplary embodiments are directed to an example in which a skew amount as an example of an amount of skewing is automatically calculated by the image reading device, this is not to be construed restrictively. For example, the result of reading may be displayed on the display of the operating section UI or printed out for a visual check by the operator, and the result of the check by the operator may be input as a skew amount.

(H09) In the above exemplary embodiments, the result of reading an image of the front side of the document Gi is also applied to the back side. However, this is not to be construed restrictively. By forming the line segments 41 to 44 on front and back sides of the alignment chart, a distortion cancellation amount for the back side may be detected to correct distortion on the back side.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
    a reading member that reads an image of a document at a reading position that is set in a transport path of the document;
    a skew detector that detects an amount of skew of the document with respect to a transport direction of the document;
    a distortion detector that detects an amount of distortion in the document that has been read, the amount of distortion being a deviation, from a right angle, of an angle formed by a direction transverse to the transport direction of the document with the transport direction of the document; and
    an image correcting unit that rotates the image that has been read, in accordance with an amount that cancels the amount of skew detected by the skew detector, and corrects distortion of the read image in accordance with an amount that cancels the amount of distortion, wherein
    the skew detector detects the amount of skew for each sheet of the document; and
    the distortion detector detects the amount of distortion in advance based on a predetermined document.

2. The image reading device according to claim 1, wherein:
    the skew detector detects an amount of skew of a leading edge in the transport direction of the document; and
    the image correcting unit rotates the image that has been read, in accordance with an amount that cancels the amount of skew detected by the skew detector, and corrects distortion of the read image by progressively shifting, along the transport direction of the document, a position at which to read out the read image.

3. The image reading device according to claim 1, wherein:
    the skew detector detects an amount of skew of a side edge in the transport direction of the document; and
    the image correcting unit rotates the image that has been read, in accordance with an amount that cancels the amount of skew detected by the skew detector, and corrects distortion of the read image by reading out the read image along a direction that is inclined based on the amount that cancels the amount of distortion.

4. The image reading device according to claim 2, wherein:
    the skew detector detects an amount of skew of a leading edge and an amount of skew of a trailing edge in the transport direction of the document; and
    the image correcting unit rotates the image that has been read, in accordance with an amount that cancels the amount of skew of the leading edge detected by the skew detector, and corrects distortion of the read image by progressively shifting, along the transport direction of the document, a position at which to read out the read image, and reading out the read image along a readout direction that is set in accordance with a deviation in the amount of skew between the leading edge and the trailing edge.

5. An image reading device comprising:
    a reading member that reads an image of a document at a reading position that is set in a transport path of the document;
    a skew detector that detects an amount of skew of the document with respect to a transport direction of the document;
    a distortion detector that detects an amount of distortion in the document that has been read, the amount of distortion being a deviation, from a right angle, of an angle formed by a direction transverse to the transport direction of the document with the transport direction of the document; and
    an image correcting unit that rotates the image that has been read, in accordance with an amount that cancels the amount of skew detected by the skew detector, and corrects distortion of the read image in accordance with an amount that cancels the amount of distortion, wherein
    the skew detector detects an amount of skew of a leading edge in the transport direction of the document, and
    the image correcting unit rotates the image that has been read, in accordance with an amount that cancels the amount of skew detected by the skew detector, and corrects distortion of the read image by progressively shifting, along the transport direction of the document, a position at which to read out the read image.

6. The image reading device according to claim 5, wherein:
    the skew detector detects an amount of skew of a leading edge and an amount of skew of a trailing edge in the transport direction of the document; and
    the image correcting unit rotates the image that has been read, in accordance with an amount that cancels the amount of skew of the leading edge detected by the skew detector, and corrects distortion of the read image by progressively shifting, along the transport direction of the document, a position at which to read out the read image, and reading out the read image along a readout direction that is set in accordance with a deviation in the amount of skew between the leading edge and the trailing edge.

7. An image reading device comprising:
    a reading member that reads an image of a document at a reading position that is set in a transport path of the document;
    a skew detector that detects an amount of skew of the document with respect to a transport direction of the document;
    a distortion detector that detects an amount of distortion in the document that has been read, the amount of distortion being a deviation, from a right angle, of an angle formed by a direction transverse to the transport direction of the document with the transport direction of the document; and
    an image correcting unit that rotates the image that has been read, in accordance with an amount that cancels the amount of skew detected by the skew detector, and corrects distortion of the read image in accordance with an amount that cancels the amount of distortion, wherein the skew detector detects an amount of skew of a side edge in the transport direction of the document, and the image correcting unit rotates the image that has been read, in accordance with an amount that cancels the amount of skew detected by the skew detector, and corrects distortion of the read image by reading out the read image along a direction that is inclined based on the amount that cancels the amount of distortion.

* * * * *